March 30, 1965     J. G. LINDSAY ET AL     3,175,883
PROCESS FOR REDUCING THE SODA CONTENT OF ALUMINA
Filed June 5, 1961
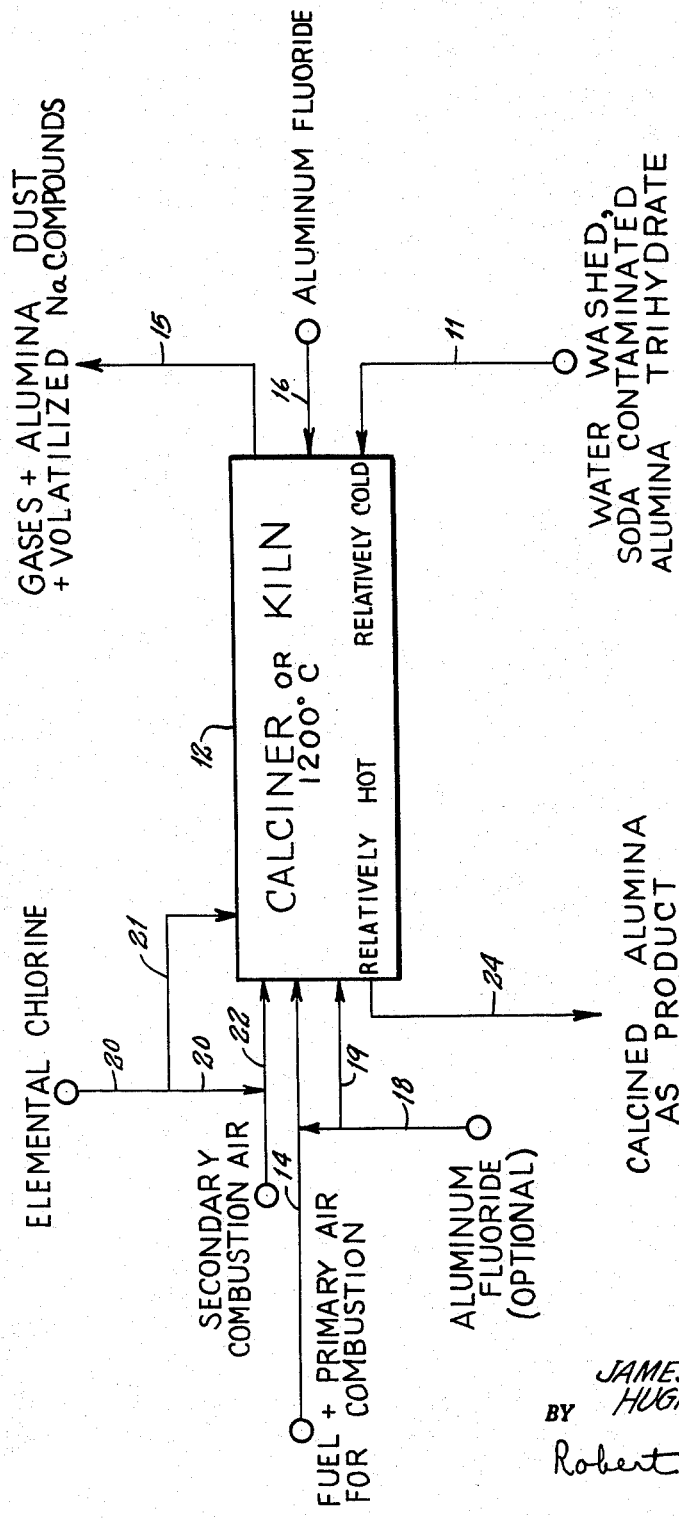
INVENTORS
JAMES G. LINDSAY
HUGH J. GAILEY
BY Robert S. Dunham
ATTORNEY

United States Patent Office 3,175,883
Patented Mar. 30, 1965

3,175,883
PROCESS FOR REDUCING THE SODA
CONTENT OF ALUMINA
James Gordon Lindsay and Hugh Joseph Gailey, Arvida,
Quebec, Canada, assignors to Aluminium Laboratories
Limited, Montreal, Quebec, Canada, a corporation of
Canada
Filed June 5, 1961, Ser. No. 114,947
2 Claims. (Cl. 23—142)

This invention relates to alumina, anhydrous and/or hydrated alumina. More particularly, this invention relates to the treatment of alumina for the production of high purity industrial alumina having improved physical properties. Still more particularly, this invention relates to the treatment of soda (measured as $Na_2O$) contaminated alumina for the preparation of substantially soda-free alumina or alumina having substantially reduced soda contamination. Also, this invention relates to the treatment of alumina for the preparation of alumina having improved physical properties, particularly with respect to the crystalline structure thereof. Still more particularly, this invention relates to the preparation of calcined alumina having improved physical properties and useful in the fabrication of electrical insulators, such as electrical insulating bodies useful in the manufacture of spark plugs and the like. Further, this invention relates to the preparation of $\alpha$-alumina or corundum having improved purity and physical properties.

Alumina, particularly calcined alumina, is useful in the manufacture of electrical insulators. For such use it is desirable that the alumina be substantially free of sodium contamination, usually referred to as soda ($Na_2O$) contamination, since soda contamination adversely affects the electrical properties of alumina. In general, the lower the sodium content or soda contamination of alumina the better suited the alumina is for such uses as electrical insulators and the like, provided that the alumina is of such a physical nature so as to produce a ceramic body whose characteristics or physical properties such as firing shrinkage, modulus of rupture, resistance to thermal shock, etc., are also satisfactory or acceptable.

In commerce alumina is for the most part manufactured from aluminous material, i.e., aluminum containing material such as bauxite. One well-known process for the manufacture of alumina is the Bayer process and the practice of this invention is particularly useful in the treatment of alumina produced by means of the Bayer process. In the Bayer process aluminous material, such as bauxite, after suitable heat treatment for the removal of organic materials, is digested with aqueous caustic solution to produce an aqueous sodium aluminate solution. The resulting aqueous sodium aluminate solution is then treated to precipitate alumina therefrom, usually in the form of alumina trihydrate. The precipitated alumina trihydrate, after suitable washing, is recovered as alumina product or may be heat treated or calcined, to produce anhydrous alumina or alumina of a desired lower degree of hydration.

In the commercial production of alumina, such as by the above-described Bayer process, the alumina contains certain impurities, particularly sodium contamination or soda contamination.

Accordingly, it is an object of this invention to provide an improved process for the production of alumina having a reduced soda contamination.

It is another object of this invention to provide a process for the treatment of alumina wherein there is produced alumina having improved physical properties and other characteristics.

Another object of this invention is to provide a substantially continuous process for the treatment of alumina, either anhydrous alumina or hydrated alumina or mixtures thereof, to produce a calcined alumina product having a reduced soda contamination and improved crystal structure and other physical characteristics.

Still another object of this invention is to provide a process for the treatment of alumina produced by means of the Bayer process wherein the resulting produced and treated alumina recovered as product has a substantially reduced soda content, particularly as compared with the soda content of alumina as produced directly from the Bayer process without any subsequent treatment.

Yet another object of this invention is to provide calcined alumina useful in the manufacture of electrical insulators, spark plugs and the like.

How these and other objects of this invention are achieved will become apparent in the light of the accompanying disclosure and drawing where there is schematically illustrated a process flow in accordance with one embodiment of the practice of this invention. In at least one embodiment of the practice of this invention at least one of the foregoing objects will be achieved.

It has now been discovered that alumina having improved properties is obtained by calcining soda-contaminated, particle-form alumina in the presence of a chlorine-containing material, such as, and preferably, gaseous chlorine or hydrogen chloride, and in the presence of fluorine-containing material, such as, and preferably, hydrogen fluoride or aluminum fluoride. More particularly, it has been discovered that sodium-contaminated alumina, usually referred to as soda-contaminated alumina, can be treated to yield an alumina product having a reduced sodium contamination or a reduced soda content and improved physical properties, particularly as to crystalline structure, by calcining alumina at an elevated temperature, such as a temperature in the range 1000–1400° C., preferably at a temperature of at least 1200° C., in the presence of a chlorine-containing material such as elemental chlorine or hydrogen chloride and in the presence of a fluorine-containing material, preferably aluminum fluoride or hydrogen fluoride. It has been found that when soda-contaminated alumina is treated in accordance with the practices of this invention, such as alumina having a soda contamination of about 0.65% by weight based on alumina, as $Al_2O_3$, more or less, the soda contamination is substantially reduced.

In the treatment of soda-contaminated alumina in accordance with this invention, alumina, anhydrous, partially hydrated of fully hydrated or mixtures thereof, satisfactorily respond to treatment and evidence improvement in physical properties, crystalline structure and soda content. Alumina as produced via the Bayer process is particularly susceptible to treatment in accordance with this invention.

In the calcining operation wherein the alumina is heat treated in the presence of the special treating agents of this invention, conventional calcining temperatures are employed. Preferably, however, the calcining operation is carried out at a temperature of at least 1200° C. Any suitable means for effecting calcining or high temperature heat treatment in the presence of the combination of treating agents, e.g., chlorine or hydrogen chloride and aluminum fluoride or hydrogen fluoride or even elemental fluorine, may be employed. Particularly suitable for carrying out the heat treatment or calcining operation is a direct fired rotary kiln wherein air admixed with a suitable fuel such as oil or gas or pulverized solid fuel such as coal or coke, or mixtures thereof, is supplied at one end, usually referred to as the hot end, of the kiln and particle-form alumina either in the dry or moist state or in an aqueous slurry is supplied to the other or cold end of a kiln. The hot combustion gases from the hot end of the kiln pass in direct counter-current contact with the particle-form alumina. The resulting calcined alumina is recovered as product at about the hot end of the kiln and combustion gases together with any alumina dust particles and volatilized contaminants, e.g., volatilized sodium compounds derived from the soda contaminants in the feed alumina, are withdrawn at the other end or cold end of the kiln. Although it is preferred to carry out the heat treatment or calcining operation in a direct fired rotary kiln any other means suitable for effecting high temperature heat treatment of particle-form alumina in direct contact with the treating agents, admixture of chlorine-containing material, e.g., chlorine, and fluorine-containing material, e.g., aluminum fluoride, may be employed. Other suitable means for effecting high temperature contact would include a vessel containing a fluidized mass of alumina particles, the mass of aluminum particles being fluidized by an upwardly flowing stream of hot combustion gases containing the admixture of treating agents of this invention entrained and/or volatilized therein, together with means for continuously introducing fresh, particle-form alumina and withdrawing treated alumina particles.

In the calcining or heat treatment operation of this invention higher calcining temperatures improve the removal of soda contaminants from the alumina undergoing treatment. Accordingly, it is preferred to effect the heat treatment at a temperature as high as practical, preferably above about 1200° C. but below the incipient fusion or melting point of the alumina particles. Further, it is desirable that the alumina particles undergoing treatment be subjected to calcining and in contact with the treating agents of this invention for a period of time at least sufficient to reduce the soda contamination of the alumina substantially below that of the feed alumina, such as a period of time sufficient to reduce the soda contamination by about 30% or one-third, preferably by about 75%. For example, in the practice of this invention it is preferred that the alumina undergoing heat treatment be calcined in the presence of the treating agents for a period of time at least sufficient to reduce the soda contamination or soda content in the treated alumina to at least below about 0.15% by weight based on the treated alumina, $Al_2O_3$. Usually, a calcining time of at least about 15 minutes, more or less, yields a satisfactory treated alumina product. Accordingly, a calcining time in the range 0.3–3.5 hours, or more, would yield a satisfactory calcined alumina product. It is pointed out that the longer the calcining time the lower the soda content or soda contamination in the treated alumina and the greater the crystal development or growth in the resulting calcined alumina.

The treating agents employed in the practice of this invention include any chlorine-containing material and any fluorine-containing material which under the calcining conditions employed is rendered in a form capable of reacting with the soda contamination in the alumina undergoing treatment to yield a volatilizable sodium compound such as sodium chloride or cryolite at the calcining or heat treatment temperature employed.

In the practice of this invention it is preferred to employ elemental chlorine, gaseous chlorine, as the chlorine-containing treating agent. Other suitable chlorine-containing treating agents include such inorganic chlorine-containing compounds as ammonium chloride, hydrogen chloride, anhydrous or as hydrochloric acid, aluminum chloride, as well as various other chlorine-containing materials or compounds, including organic or organic type chlorine containing compounds capable of decomposition to chlorine-containing forms capable of reacting with the soda contamination in the alumina undergoing treatment to form a volatilizable sodium compound. Suitable other chlorine-containing compounds include phosgene, the chlorocarbons such as carbon tetrachloride and chlorinated hydrocarbons containing from 1–12 and more, carbon atoms per molecule. In the use of the chlorine-containing treating agent it has been observed that by itself the chlorine-containing treating agent is effective for the removal of the soda contaminant from the alumina but that this effect is particularly noticeable at relatively high concentrations of the chlorine-containing treating agent, such as at a concentration in the treating zone of above 1.5% by weight based on alumina. It has also been observed that at these relatively high concentrations of the chlorine treating agent, i.e., above about 1.5% chlorine by weight based on alumina, the chlorine agent is effective as a mineralizing agent for the promotion of crystalline alumina, crystalline α-alumina, but that the resulting formed crystalline alumina has a relatively small, undesirable, crystal size, such as an average crystal size in the range 1–3 microns, more or less. In most instances wherein alumina is employed in the fabrication of solid bodies, such as electrical insulators and the like, it is generally preferred that the alumina employed have a substantially greater crystal size, such as an average crystal size of at least about 5 microns, e.g., an average crystal size in the range 6–12 microns, more or less, with a maximum crystal size in the range 15–55 microns, more or less.

It is, accordingly, a feature of this invention that calcined alumina having a desired relatively large crystal, such as an average size of at least 5 microns, is produced by employing a fluorine-containing material, particularly inorganic fluorine-containing compounds such as hydrogen fluoride or aluminum fluoride, as an additional treating agent along with the chlorine-containing material during the calcining operation. The fluorine-containing material as a treating agent is also effective for the removal of the soda contamination in the alumina as well as being effective in promoting relatively large crystal size in the calcined alumina.

Suitable fluorine-containing materials in addition to aluminum fluoride and hydrogen fluoride, anhydrous or as hydrofluoric acid, include such materials as ammonium fluoride and elemental fluorine. Other fluorine-containing materials including the fluorocarbons and organic fluorine-containing compounds are also useful in the practice of this invention provided these materials hydrolyze or otherwise decompose at the calcining temperature employed into forms capable of reacting with the soda contamination in the alumina undergoing treatment to yield a sodium compound volatilizable at the calcining temperature employed. Suitable other fluorine-containing compounds include the fluorocarbons such as carbon tetrafluoride and fluorinated hydrocarbons containing from 1–12, and more, carbon atoms per molecule.

Treating agents which are both chlorine-containing and fluorine-containing are also advantageously employed in the practice of this invention, either alone or in combination with other chlorine-containing compounds and/or fluorine-containing compounds and/or fluorine-containing, chlorine-containing compounds. Such chlorine-containing, fluorine-containing compounds are chlorine trifluoride, $ClF_3$, and the halocarbons containing both chlorine atoms and fluorine atoms, e.g. $CF_2Cl_2$, $CF_2Cl$, $CCl_3F$, as well as the halogenated hydrocarbons containing from 1–12, and more, carbon atoms per molecule and containing both chlorine and fluorine atoms.

It is pointed out that in the practice of this invention one or more fluorine-containing materials introduced into the high temperature treatment zone, separately or in admixture, and one or more chlorine-containing materials introduced into the high temperature treatment zone, separately or in admixture, may be employed.

In the heat treatment operation only minor amounts of the chlorine-containing material and fluorine-containing material are employed. Generally an amount of chlorine-containing material, such as elemental chlorine or hydrogen chloride, in the range 0.5–10% chlorine or chlorine content based on the weight of the product calcined alumina, is sufficient to yield satisfactory results, i.e., the production of a calcined alumina product having a substantially reduced soda contamination. Also, a minor amount of fluorine-containing material is employed during the calcining operation, such as an amount of fluorine-containing material, e.g., hydrogen fluoride or aluminum fluoride, in the range 0.01–2% fluorine, or more, as high as 5%, by weight based on the product calcined alumina. Expressed in another manner, an amount of fluorine-containing material having a fluorine content equivalent to the fluorine content of 0.05–2% by weight, more or less, aluminum fluoride may be used.

As indicated hereinabove the effect of the presence of the fluorine-containing material during the calcining operation is to promote the crystal growth of the alumina undergoing calcining with the formation of rather large alumina monocrystals, average crystal size in the range 5–12 microns. Additionally, the fluorine-containing material serves as an agent, auxiliary to the chlorine-containing material, for the removal of soda contamination from the alumina undergoing treatment. Accordingly, in connection with this aspect of the invention it is desirable that the fluorine-containing compound employed be capable per se, or as a result of pyrohydrolysis during calcining, of forming a product capable of reacting with the soda contamination in the alumina to yield a sodium compound volatilizable during the calcining operation and removable with the gases passing through and withdrawn from the calcining operation. Therefore, in the practice of this invention the combination of treating agents serves a two-fold purpose: (1) to remove soda contamination from the alumina undergoing a treatment and (2) to improve the physical properties of the resulting calcined alumina by promoting growth of rather large monocrystals of alumina during the calcining operation. By means of the combination of treating agents employed during the calcining operation, the chlorine-containing component serves effectively to reduce the soda contamination in the alumina undergoing treatment and the fluorine-containing component serves to promote the desired crystalline growth of the calcined alumina and additionally is effective as an agent for removal of soda contamination.

Referring now to the accompanying drawing which schematically illustrates a process flow in accordance with this invention, soda-contaminated alumina, such as soda-contaminated alumina trihydrate as may be produced as a product of the Bayer process for the manufacture of alumina from bauxite and having a soda contamination content of about 0.65% by weight soda, is supplied, after water-washing, from a suitable source, not shown, via line 11 to one end, such as the relatively cold end, of a direct fired rotary kiln or calciner 12.

Kiln or calciner 12 is heated or fired by supplying to the other end or hot end thereof via line 14 a combustible admixture comprising a suitable fuel, such as fuel, oil and air. During firing the hot combustion gases flow from the relatively hot end of calciner 12 to the relatively cold end thereof and are recovered therefrom via line 15. The combustion gases recovered from the relatively cold end of calciner 12 via line 15 may then be treated for the recovery of values therefrom, such as precipitation or filtration of alumina dust by suitable means and the resulting substantially dust-free gases passed to a waste heat boiler for the recovery of heat values.

In the embodiment of this invention illustrated in the drawing a minor amount of fluorine-containing treating agent, such as aluminum fluoride, is introduced into the cold end of calciner 12 via line 16. The aluminum fluoride introduced into calciner 12 may be introduced separately, as illustrated, or in admixture with the alumina trihydrate introduced into calciner 12 via line 11. Optionally, the fluorine-containing treating agent, aluminum fluoride, may be introduced into calciner 12 at the hot end thereof separately via lines 18 and 19 or in admixture with the fuel and primary combustion air via lines 18 and 14.

Chlorine-containing treating agent, such as gaseous chlorine, is introduced into the relatively hot end of calciner 12 via lines 20 and 21. Preferably, chlorine is introduced into calciner 12 in admixture with the secondary combustion air supplied to calciner 12 via line 22. Although in the drawing the secondary combustion air is shown supplied to calciner 12 via line 22 in actual practice the secondary combustion air is the air which enters or leaks into the calciner at the exit end thereof from the calcined alumina. Also, if desired, the chlorine-containing treating agent may be supplied to calciner 12 via the combustible mixture supplied via line 14.

During the calcining operation a temperature of at least about 1200° C. is maintained within calciner 12, at least at about the relatively hot end thereof as the feed alumina hydrate is advanced or moved from the relatively cold end of calciner 12 to the relatively hot end thereof. As the alumina moves along within calciner 12 from the cold end to the hot end thereof it is subjected to a calcining temperature, at least about 1200° C. in the presence of and in contact with the added aluminum fluoride and gaseous chlorine. As a result of this high temperature contact between the alumina and the gaseous chlorine and aluminum fluoride, the soda contamination in the alumina is reduced, the chlorine and aluminum fluoride or pyrohydrolysis products therefrom reacting with the soda contaminants in the alumina to form volatilizable sodium compounds which are volatilized during the calcining operation. These volatilizable sodium compounds are swept along with the hot combustion gases flowing within calciner 12 from the hot end to the cold end thereof and are withdrawn from calciner 12 via line 15.

As indicated the gases withdrawn from calciner 12 via line 15 contain entrained therein alumina dust particles and the volatilized sodium compounds due to the removal of the sodium contaminants from the alumina undergoing treatment. Desirably, the entrained alumina dust is recovered from the gases removed via line 15 and, if desired, the thus-separated and recovered alumina dust is passed to another kiln for conventional calcining or another calcining operation in accordance with this invention. If desired, the alumina dust withdrawn from calciner 12 via line 15 is separated and recovered and after water washing can be reintroduced into calciner 12 in admixture with the alumina trihydrate material supplied to calciner 12 via line 11 or introduced into calciner 12 at any other suitable location. There is withdrawn from the relatively hot end of calciner 12 via line 24 resulting calcined treated alumina now having a substantially reduced soda contamination, e.g., below about 0.15% by weight soda and an improved crystal size, relatively large alumina monocrystals, usually aggregates thereof, the monocrystals having an average crystal size in the range 5–12 microns.

Although in the foregoing description of the invention made with reference to the accompanying drawing wherein elemental chlorine is a chlorine-containing material and aluminum fluoride is the fluorine-containing material, other suitable chlorine-containing materials and fluorine-containing materials may be employed or mixtures thereof. Further, the chlorine-containing and the fluorine-containing material may be introduced into the hot end or the cold end of the calciner, separately or in admixture with themselves or with the alumina material undergoing calcining treatment or in the combustion air supplied to the calciner. The choice of whether or not the chlorine-containing material and the fluorine-containing material is added at the hot or cold end of the calciner depends substantially upon the physical properties, particularly volatility, of the fluorine-containing and chlorine-containing materials. The gaseous or more readily volatile materials are desirably introduced into the calciner at the hot end thereof so that these materials travel substantially the full length of the calciner in contact with alumina undergoing treatment before withdrawal from the calciner with the effluent combustion gases. Less readily volatilizable chlorine-containing and fluorine-containing materials are usually introduced into the cold end of the calciner. Further, when chlorine-containing and fluorine-containing materials employed are normally solid materials or less readily volatile such materials are desirably introduced into the calciner at the cold end thereof in admixture with the feed alumina and would move along and within the calciner admixed with the alumina therein towards the hot end of the calciner until these materials were substantially completely volatilized and/or consumed by reaction with the sodium contamination in the alumina undergoing treatment.

The following examples are illustrative of the practices of this invention.

EXAMPLE NO. 1

Alumina material, such as alumina trihydrate having a sodium contamination of at least about 0.65% by weight soda, based on alumina $Al_2O_3$, was calcined at a temperature of at least about 1200° C. in the presence of minor amounts of chlorine and aluminum fluoride. The resulting calcined alumina was then recovered, percent soda contamination of the resulting treated alumina was determined and the average maximum crystal size was also determined. Additionally, a solid body comprising 90% by weight of the resulting calcined alumina was compounded and heated to a temperature of 1600° C. and the firing shrinkage of the body determined. The results of these tests are set forth in accompanying Table I.

*Table I*

| Test No. | Percent $Cl_2$ (based on $Al_2O_3$) | Percent $AlF_3$ (based on $Al_2O_3$) | Crystal Size (microns) Avg. | Crystal Size (microns) Max. | Percent $Na_2O$ (based on $Al_2O_3$) | Firing Shrinkage on a 90% $Al_2O_3$ body at 1,600° C. |
|---|---|---|---|---|---|---|
| 1 | 0.5 | 0.4 | 5-6 | 15 | 0.44 | 14.5 |
| 2 | 1.0 | 0.4 | 6 | 18-20 | 0.36 | 14.5 |
| 3 | 2.0 | 0.4 | 7 | 20 | 0.23 | 11.9 |
| 4 | 0.5 | 1.5 | 10 | 40-45 | 0.33 | 12.7 |
| 5 | 1.0 | 1.5 | 12 | 45 | 0.28 | 12.2 |
| 6 | 2.0 | 1.5 | 12 | 50-55 | 0.22 | 11.3 |

EXAMPLE NO. 2

Alumina material having a soda contamination of at least 0.65% by weight soda based on alumina, $Al_2O_3$, was calcined in a production size direct fired rotary kiln at a temperature of 1200° C. in the presence of 2% by weight chlorine and 1% by weight aluminum fluoride, the by weight being based on the resulting calcined alumina product. As a result of the calcining operation there was produced calcined crystalline alumina having an average monocrystal size of about 7-8 microns and a soda content of about 0.12% by weight soda based on alumina.

EXAMPLE NO. 3

An amount of calcined alumina produced in Example No. 2 was compounded into a ceramic body by ball milling a mixture of 90% by weight of the calcined $Al_2O_3$, 5% by weight talc and 5% kaolin for a period of 8 hours in a jar mill. The resulting milled mixture was then dried pressed into test bricks at a pressure of 5000 p.s.i.g. The test bricks were then fired at a temperature of 1600° C. to maturity. The resulting fired ceramic bodies showed a shrinkage of 11.0%.

The foregoing examples are illustrative of advantages obtainable in the practices of this invention and indicate how by means of the combination of treating agents, the chlorine-containing treating agent, e.g., elemental chlorine and the fluorine-containing treating agent, e.g., aluminum fluoride, there is produced from soda contaminated alumina material, such as soda contaminated alumina trihydrate, a calcined crystalline alumina comprising substantially 100% α-alumina having a greatly reduced soda contamination and comprised of substantially large monocrystals, monocrystals having an average crystal size in the range 5–12 microns. Further illustrative of the advantages obtained in accordance with the practices of this invention, alumina material having a soda contamination of about 0.65% by weight soda was calcined at a temperature of 1300° C. in the absence of and in the presence of varying amounts of gaseous chlorine. The results of these tests are set forth in accompanying Table II.

*Table II*

| Test No. | Percent Chlorine (based on $Al_2O_3$) | Percent Alpha Alumina | Average α-alumina Crystal Size (microns) | Percent $Na_2O$ (based on $Al_2O_3$) |
|---|---|---|---|---|
| 7 | 0 | 0 | | 0.59 |
| 8 | 1.1 | 75 | 1 | 0.16 |
| 9 | 1.7 | 100 | 2 | 0.03 |
| 10 | 3.2 | 100 | 2 | 0.03 |

The data set forth in accompanying Table II show that although chlorine is effective as an agent during calcining for reducing soda contamination in the alumina material undergoing treatment, chlorine by itself is not effective in promoting crystalline growth of the calcined alumina to yield relatively large monocrystals of alumina. More particularly, the test data set forth in Table II clearly indicate that when chlorine alone is employed in a calcining operation the resulting crystalline calcined alumina comprises fine, small monocrystals having an average crystal size in the range 1–2 microns and, accordingly, less preferred in the manufacture of solid alumina bodies, such as electrical insulators and spark plugs, because of the greater shrinkage of such bodies during firing, particularly as compared with alumina bodies made up of relatively large alumina crystals, such as alumina crystals having an average crystal size in the range 5–12 microns, as produced in accordance with this invention.

As will be apparent to those skilled in the art in the light of the foregoing disclosure many modifications, alterations and substitutions are possible in the practice of this invention without departing from the spirit or scope thereof.

We claim:
1. A method of treating soda-contaminated alumina hydrate to reduce the soda content thereof and to provide a substantial 100% crystalline alpha-alumina product having a desired average crystal size in the range 5–12 microns which comprises calcining soda-contaminated, particle-form alumina hydrate at an elevated temperature from about 1000° C. up to the melting point of alumina in the presence of gaseous elemental chlorine and aluminum trifluoride, said chlorine and said aluminum trifluoride being employed in an amount in the range 0.5–10% and 0.01–5% by weight, respectively, based on the resulting treated alumina and being capable of yielding with the soda in said alumina hydrate at the aforesaid calcining temperature a volatilizable sodium compound, the aforesaid calcining operation being carried out for a period of time in the range 0.3–3.5 hours sufficient to reduce the soda content of said soda-contaminated alumina hydrate by at least about 30%, and recovering as product the resulting treated alumina characterized as a substantially 100% crystalline alpha-alumina product having a desired average crystal size in the range 5–12 microns.

2. In an operation wherein soda-contaminated particle-form alumina hydrate is introduced into a calcining zone maintained at an elevated temperature from about 1000° C. up to the melting point of alumina to effect removal and mineralization of the soda-contaminated alumina hydrate, said calcining zone being characterized by a hot end and a cold end, the soda-contaminated alumina hydrate being introduced into said calcining zone at said cold end and the resulting calcined alumina being recovered from said calcining zone at said hot end, said calcined alumina having a reduced soda content and having been mineralized, the improvement which consists essentially of introducing gaseous elemental chlorine into said calcining zone at said hot end and simultaneously introducing said aluminum trifluoride into said calcining zone at said cold end and recovering as product from said calcining zone at said hot end a substantially 100% crystalline alpha-alumina having a desired average crystal size in the range 5–12 microns and having a soda content at least about 30% below the soda content in the soda-contaminated alumina hydrate supplied to said calcining zone, the aforesaid calcining operation being carried out for a period of time in the range 0.3–3.5 hours.

References Cited by the Examiner
UNITED STATES PATENTS 2,411,806 11/46 Riesmeyer _____ 23—143
2,411,807 11/46 Riesmeyer _____ 23—143

MAURICE A. BRINDISI, *Primary Examiner.*